Patented Jan. 15, 1935

1,987,685

UNITED STATES PATENT OFFICE 1,987,685

METHOD OF MAKING ORGANIC MERCURY COMPOUNDS

Morris S. Kharasch, Chicago, Ill., assignor to E. I. du Pont de Nemours & Company, Wilmington, Del., a corporation of Delaware No Drawing. Application November 30, 1929, Serial No. 410,863

14 Claims. (Cl. 260—13)

This invention relates to the preparation of certain types of organic mercury compounds.

This application is a continuation in part of my copending application Serial No. 231,159, filed November 4th, 1927.

Up to the present time the methods utilized in the preparation of organic mercuric compounds, of the type represented by ethyl mercuric chloride, have been very laborious and time consuming. Due to the difficulty of producing these materials, such mercurials are not readily available, and are very expensive. Ethyl mercuric chloride, for example, is generally prepared in either of two ways. First, by treating ethyl bromide with sodium amalgam, and decomposing the mercury diethyl thus formed with mercuric chloride. The yields by this method are very poor, and the method is only of historical interest. The second method of preparing ethyl mercuric chloride is by the use of the so called Grignard reagent. This method requiring, as it does, the use of anhydrous ether in large quantities, is a reaction very poorly suited for large scale operations, because of the dangers inherent in the method. Furthermore, the final cost of the product obtained by this method is necessarily very high.

My invention, therefore, has for its primary object the production of organic substituted mercury compounds from reagents which are readily available, and from which the desired mercury compounds may be produced inexpensively, quickly and by a very simple procedure. By the use of my method disclosed hereinafter, ethyl mercuric chloride or any other ethyl mercuric salt can be prepared from lead tetraethyl, which is now available in large quantities at a relatively low cost.

A further object of my invention is the elimination of ether and the consequent dangers of explosion. A still further object is the elimination of costly reagents, and the expensive apparatus which have heretofore been necessary in the production of compounds such as those to which the present invention relates. Other objects will appear hereinafter.

These objects are accomplished by the following invention, which consists in reacting a mercury salt with an alkyl or aryl derivative of a tetravalent metal.

I have found that when a mercuric salt is permitted to react with an alkyl or aryl substituted compound of a tetravalent metal lying between mercury and the alkali metals in the electrochemical series, preferably in the presence of a solvent, an almost immediate precipitation of an alkyl or aryl substituted mercury compound is formed.

In order to illustrate my invention more fully the following examples are given, but it will be understood that these are illustrative merely and are not to be taken in any way as limitations of my invention.

*Example 1.*—To thirty-three grams of mercuric chloride dissolved or suspended in alcohol, twenty grams of tetraethyl lead are slowly introduced, the whole being well agitated. An immediate precipitation of ethyl mercuric chloride begins. The mixture is then heated on a water bath for about thirty minutes. A volume of water equal to that of the alcohol initially used is then added, the whole is cooled, and the precipitate collected on a filter. The filtrate when boiled further gives an additional quantity of ethyl mercuric chloride. The precipitates obtained are combined, and the ethyl mercuric chloride extracted from them by use of a suitable extractor, such as a Wiley extractor, using alcohol as a solvent. The melting point of the product thus obtained is 193° C., indicating a high degree of purity of the ethyl mercuric chloride produced. In this case, as proved by the isolation of the products the reaction probably proceeded as indicated by the following equation:

$$(C_2H_5)_4Pb + 2HgCl_2 \rightarrow (C_2H_5)_2PbCl_2 + 2C_2H_5HgCl$$

*Example 2.*—To thirty-three grams of mercuric chloride dissolved or suspended in alcohol, fifteen grams of tetramethyl lead are slowly introduced, the whole being well agitated, and immediate precipitation of methyl mercury chloride begins. The mixture is then heated on a water bath for thirteen minutes. A volume of water equal to that of the alcohol initially used is then added. The whole is cooled and the precipitate collected on a filter. The precipitate, when obtained, as indicated in Example 1, shows a melting point of 172° C., which indicates a high degree of purity of the methyl mercuric chloride obtained. The probable equation is:

$$(CH_3)_4Pb + 2HgCl_2 \rightarrow 2CH_3HgCl + (CH_3)_2PbCl_2$$

*Example 3.*—To five grams of lead tetraphenyl dissolved in benzene, five grams of mercuric chloride are added, and the whole boiled for one hour. At the end of that time the mixture is cooled and the solid collected on a filter. It is then subjected to extraction in a suitable extractor, using acetone or benzene as the solvent. The phenyl mercuric chloride is thus extracted in solution, and may be obtained by evaporation of a solvent. The melting point of a phenyl mercuric chloride thus obtained is 252° C., indicating a very high degree of purity. The probable equation is:

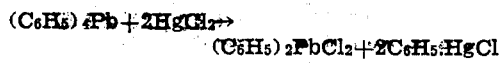

Example 4.—To thirty-two grams of tri-ethyl lead chloride suspended or dissolved in alcohol twenty-seven grams of mercuric chloride are added. The whole is boiled for thirty minutes, and the ethyl mercuric chloride is isolated in the manner indicated in Example 1. The probable equation is:

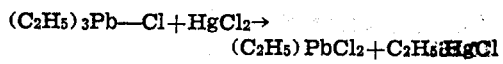

Example 5.—To a solution of twenty-two grams of mercuric chloride in 400 c.c. of ethyl alcohol, 8.5 grams of tin tetraphenyl are added. There is no appreciable reaction in the cold, but upon warming the mixture a vigorous reaction commences, and may be completed by boiling the mixture from thirty to forty minutes. The mixture is then cooled and the precipitate collected on a filter. From the filtrate a further quantity of the material may be obtained by the addition of water. The melting point of the phenyl mercuric chloride thus obtained is about 245° C., and the addition of pure phenyl mercury chloride to this material does not depress the melting point of the latter. The yield indicates that all four of the phenyl groups were taken off the tin and attached to the mercury. The probable equation is:

$(C_6H_5)_4Sn + 4HgCl_2 \rightarrow 4C_6H_5.HgCl + SnCl_4$

Example 6.—To a solution of fifty-four grams of mercuric chloride in 500 c.c. of ethyl alcohol, twelve grams of tetraethyl tin is added. If the solution is boiled for about two hours and the alcoholic solution then poured into water, the ethyl mercuric chloride can be filtered off. The yield is quite good and the purity of the product very high.

In this reaction the ethyl groups cannot be removed completely by boiling mercuric chloride with tetraethyl tin in alcohol. For this reason the probable equations cannot be given.

Example 7.—To a solution of sixty-three grams of mercuric acetate in 200 c.c. of glacial acetic acid, twelve grams of tetraethyl tin are added, and the solution boiled for about twenty minutes. There is thus obtained a solution of ethyl mercuric acetate, which can be readily demonstrated by the use of sodium hydroxide on a test portion of the solution; the sodium hydroxide indicates that no more mercuric ions as such are free in the solution. Ethyl mercuric acetate can be easily converted into the more insoluble chloride by pouring the solution into water and treating with a concentrated solution of 100 grams of sodium chloride. This last step is the usual reaction for converting organic mercury acetates into organic mercury chlorides. A heavy precipitate of ethyl mercuric chloride separates out and may be filtered off. The probable equation is:

$Sn(C_2H_5)_4 + 4Hg(OCOCH_3)_2 \rightarrow 4C_2H_5.HgOCOCH_3 + Sn(OCOCH_3)_4$

Example 8.—Similarly, to a solution of sixty-three grams of mercuric acetate in 200 c.c. of glacial acetic acid, sixteen grams of lead tetra-ethyl may be added, and the solution boiled for twenty minutes. The solution thus obtained may be converted, as in Example 7, by dilution with water and treatment with sodium chloride. A white precipitate of ethyl mercuric chloride is thus obtained. The yield indicates that all four of the ethyl groups initially attached to the lead have been detached therefrom and converted into the ethyl mercuric compound.

While some of the material may be lost during crystallization, the probable equation is as follows:

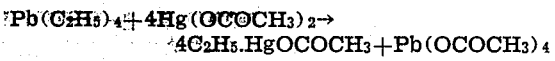

It is, of course, understood that various modifications may be introduced into this method without departing in any way from the spirit of my invention. Thus, while I have shown that mercuric chloride may be treated with tetraethyl lead in the presence of alcohol and a precipitate of ethyl mercuric chloride obtained therefrom, instead of mercuric chloride any suitable mercuric salt such as other mercuric halides and other inorganic mercuric compounds may be employed; nor is the invention limited to inorganic mercuric compounds for organic derivatives of mercury, such as mercuric acetate, may readily be used. As indicated in the examples above, it is possible to use mercuric acetate or other organic or inorganic mercuric salts in lieu of the chloride; or, to employ other solvents than alcohol or glacial acetic acid for the mercury salt, such as benzene or acetone, butyric or propionic acid, or even water in some cases, although, naturally, certain solvents are more suitable than others. Instead of tetraethyl lead, other alkyl or aryl compounds may be used. Thus tetraphenyl lead or tetracyclohexyl lead may be employed. Nor is it necessary for the purposes of my invention that all four of the valencies of tetravalent metal be satisfied by alkyl or aryl radicals; for example, tri-ethyl lead chloride or tri-phenyl lead acetate may be employed. Lead is not the only metal which may be utilized for the purpose of my invention, inasmuch as tin compounds may be used, it being only necessary that the metal used be tetravalent and lie between mercury and the alkali metals in the electrochemical series. The yield ordinarily increases if the reaction mixture be agitated while being heated, and the reaction temperature may vary according to the nature of the solvent used, being, of course, lower where a more volatile solvent is employed.

I wish it to be understood that I do not desire to be limited to the exact substances, proportions or sequence of operations described heretofore, for obvious modifications will occur to a person skilled in the art.

I claim:

1. A process of producing organic mercury compounds which comprises heating a mercury salt with an alkyl compound of tetravalent lead in the presence of a solvent.

2. A process of producing organic mercury compounds which comprises heating a mercury salt with an aryl compound of tetravalent lead in the presence of a solvent.

3. A process of producing mercury phenyl chloride which comprises heating mercuric chloride with tetraphenyl lead in the presence of alcohol.

4. A process of producing organic mercury compounds which comprises heating a mercuric salt in the presence of a solvent with an unsubstituted hydrocarbon derivative of a tetravalent metal lying between mercury and the alkali metals in the electro-chemical series.

5. A process of producing organic mercury compounds which comprises heating a mercuric salt in the presence of a solvent with a tetraalkyl compound of a tetravalent metal lying between mercury and the alkali metals in the electrochemical series.

6. A process of producing organic mercury compounds which comprises heating a mercuric salt with an alkyl derivative of tetravalent lead in the presence of a solvent.

7. A process of producing organic mercury compounds which comprises heating a mercuric salt with a tetraalkyl lead compound in the presence of a solvent.

8. A process of producing ethyl mercuric compounds which comprises heating a mercuric salt with an ethyl lead compound in the presence of a solvent.

9. A process of producing organic mercury compounds which comprises heating mercuric chloride with an alkyl derivative of a tetravalent metal lying between mercury and the alkali metals in the electrochemical series in the presence of a solvent.

10. A process of producing organic mercury compounds which comprises heating a mercuric chloride with an alkyl derivative of tetravalent lead.

11. A process of producing ethyl mercuric compounds which comprises heating mercuric chloride with tetraethyl lead.

12. A process of producing organic mercury compounds which comprises heating mercuric acetate with an alkyl derivative of a tetravalent metal lying between mercury and the alkali metals in the electrochemical series in the presence of a solvent.

13. A process of producing organic mercury compounds which comprises heating mercuric acetate with an alkyl derivative of tetravalent lead in the presence of a solvent.

14. A process of producing an ethyl mercuric compound which comprises heating mercuric acetate with tetraethyl lead in the presence of a solvent.

MORRIS S. KHARASCH.